US010237754B1

(12) United States Patent
Pawar et al.

(10) Patent No.: US 10,237,754 B1
(45) Date of Patent: Mar. 19, 2019

(54) MINIMIZING INTERFERENCE IN DIFFERENT SECTORS OF WIRELESS NETWORKS

(71) Applicant: Sprint Spectrum LP, Overland Park, KS (US)

(72) Inventors: Hemanth Pawar, Brambleton, VA (US); Shilpa Kowdley, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 118 days.

(21) Appl. No.: 15/593,417

(22) Filed: May 12, 2017

(51) Int. Cl.
*H04W 84/12* (2009.01)
*H04W 16/28* (2009.01)
*H04B 17/345* (2015.01)
*H04B 7/155* (2006.01)
*H04W 8/00* (2009.01)

(52) U.S. Cl.
CPC ........ *H04W 16/28* (2013.01); *H04B 7/15507* (2013.01); *H04B 17/345* (2015.01); *H04W 8/005* (2013.01)

(58) Field of Classification Search
CPC .............................. H04W 16/28; H04W 8/005
See application file for complete search history.

(56) References Cited

U.S. PATENT DOCUMENTS

| | | | | |
|---|---|---|---|---|
| 5,566,355 A | * | 10/1996 | Kanai | H04W 16/28 342/432 |
| 6,738,350 B1 | * | 5/2004 | Gao | H04B 7/18584 370/232 |
| 8,615,255 B1 | * | 12/2013 | Zang | G01S 5/0242 370/328 |
| 9,420,474 B1 | * | 8/2016 | Pawar | H04W 16/28 |
| 10,034,181 B1 | * | 7/2018 | Somashekar | H04W 28/0236 |
| 2002/0119772 A1 | * | 8/2002 | Yoshida | H04W 24/00 455/423 |
| 2006/0009244 A1 | * | 1/2006 | Schacht | H04W 72/1247 455/500 |
| 2007/0019651 A1 | * | 1/2007 | Saito | H04W 16/28 370/395.4 |
| 2009/0047961 A1 | * | 2/2009 | Kim | H04W 36/00835 455/436 |
| 2013/0244582 A1 | * | 9/2013 | Son | H04W 24/08 455/67.13 |
| 2014/0106807 A1 | * | 4/2014 | Bang | H04B 7/0617 455/517 |
| 2014/0226574 A1 | * | 8/2014 | Guo | H04W 16/10 370/329 |

(Continued)

*Primary Examiner* — Parth Patel

(57) ABSTRACT

Systems, methods, and processing nodes minimize interference in a wireless network. Minimizing interference includes determining that an angle between a first formed beam directed towards a wireless device and a relay signal directed towards a relay node is equal to or is less than a threshold angle. The wireless device can operate in a first area of network coverage, and the relay node operates in a second area of the network coverage. The first formed beam can interfere with the relay node upon the angle being equal to or less than the threshold angle. Minimizing interference also includes switching a connection of the relay node from a first access node to a second access node.

20 Claims, 13 Drawing Sheets

(56) References Cited

U.S. PATENT DOCUMENTS

| | | | | |
|---|---|---|---|---|
| 2014/0241460 A1* | 8/2014 | Weinholt | H04B 7/0665 | 375/296 |
| 2014/0328423 A1* | 11/2014 | Agee | H04B 7/0413 | 375/267 |
| 2014/0349677 A1* | 11/2014 | Xiao | H04W 4/02 | 455/456.1 |
| 2015/0049650 A1* | 2/2015 | Choi | H04W 28/08 | 370/278 |
| 2015/0126173 A1* | 5/2015 | Dribinski | H01Q 3/00 | 455/418 |
| 2015/0188644 A1* | 7/2015 | Kang | H04B 15/00 | 455/12.1 |
| 2015/0200451 A1* | 7/2015 | Park | H04W 16/28 | 455/562.1 |
| 2015/0215873 A1* | 7/2015 | Jeong | H04B 7/0408 | 455/522 |
| 2015/0264701 A1* | 9/2015 | Ljung | H04B 7/0452 | 455/452.1 |
| 2015/0327293 A1* | 11/2015 | Luo | H04W 72/12 | 370/252 |
| 2015/0333852 A1* | 11/2015 | Yoshizawa | H04W 36/04 | 370/252 |
| 2015/0341095 A1* | 11/2015 | Yu | H04B 7/0619 | 370/252 |
| 2016/0156393 A1* | 6/2016 | Chen | H04B 7/0413 | 370/329 |
| 2016/0277160 A1* | 9/2016 | Lim | H04L 5/006 | |
| 2017/0134913 A1* | 5/2017 | Cui | H04B 7/06 | |
| 2017/0179595 A1* | 6/2017 | Ogawa | H04W 16/28 | |
| 2017/0187504 A1* | 6/2017 | Qian | H04L 5/00 | |
| 2017/0251489 A1* | 8/2017 | Caretti | H04W 72/1273 | |
| 2017/0264355 A1* | 9/2017 | Zhang | H04J 11/003 | |
| 2017/0358851 A1* | 12/2017 | Diamond | H01Q 1/42 | |
| 2018/0069578 A1* | 3/2018 | Lee | H04B 1/406 | |
| 2018/0098289 A1* | 4/2018 | Visotsky | H04W 16/28 | |
| 2018/0103381 A1* | 4/2018 | Ramamurthi | H04W 16/28 | |

* cited by examiner

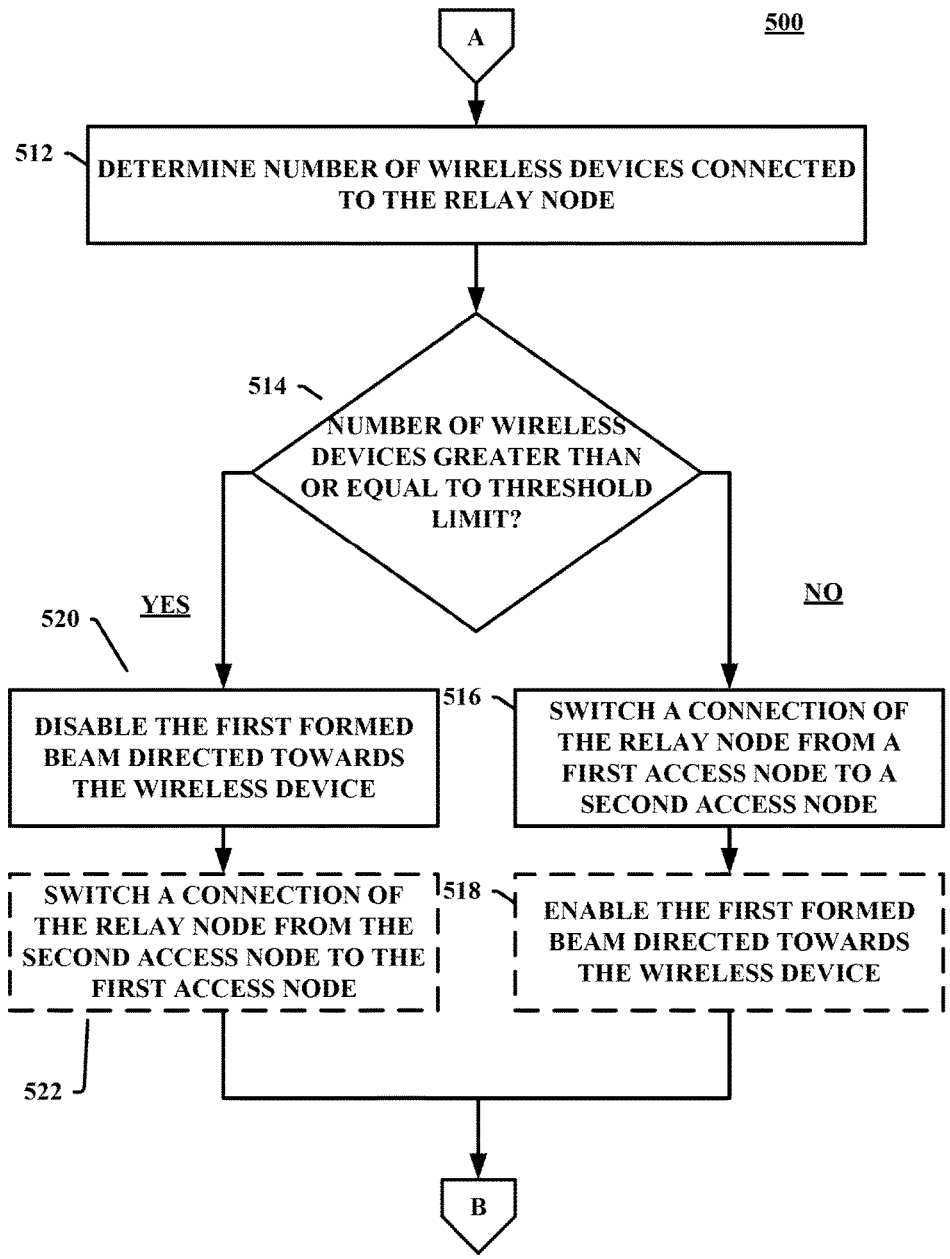

US 10,237,754 B1

MINIMIZING INTERFERENCE IN DIFFERENT SECTORS OF WIRELESS NETWORKS

TECHNICAL BACKGROUND

As wireless networks evolve and grow, there are ongoing challenges in providing high-quality service to increasing numbers of wireless devices or user equipment (UE) in various coverage areas of a wireless network. For example, beamforming is a transmission mode that is used to provide better coverage to wireless devices in specific locations within a coverage area of a cell or access node. A beamforming downlink transmission mode uses multiple antennae to direct or "steer" signals from the antennae towards a particular wireless device or relay node located at, for instance, a cell edge. However, when wireless devices are at certain positions in the coverage area, formed beams directed to those wireless devices can interfere with other wireless devices within the coverage area, thereby degrading performance for the other wireless devices. Although the wireless device receiving the formed beam remains unaffected, the intersecting signals may cause interfere for the other wireless device, particularly when both transmissions utilize the same frequencies. Further, orthogonal frequency-division multiple access based systems, such as LTE, can be prone to such interference between wireless devices in adjacent sectors, as they are commonly deployed with a frequency reuse factor of one.

Overview

Examples of embodiments described herein include systems, methods, and processing nodes for minimizing interference in a wireless network. An example of a method for minimizing interference includes determining that an angle between a first formed beam directed towards a wireless device and a relay signal directed towards a relay node is equal to or is less than a threshold angle. The wireless device operates in a first area of network coverage, and the relay node operates in a second area of the network coverage. The first formed beam interferes with the relay node upon the angle being equal to or less than the threshold angle. The method also includes switching a connection of the relay node from a first access node to a second access node.

An example of a system for minimizing interference in a wireless network includes a processing node and a processor coupled to the processing node. The processor configures the processing node to perform operations including obtaining one or more interference measurements for each of a plurality of angles between a first formed beam directed towards a wireless device in a first area of network coverage and a relay signal directed towards a relay node in a second area of the network coverage. The operations also include determining a threshold angle based at least partially on the one or more interference measurements. The threshold angle defines an angle between the first formed beam and the relay signal that causes the first formed beam to interfere with the relay signal.

An example of a processing node for minimizing interference in a wireless network is configured to perform operations including determining an angle between a first formed beam directed towards a wireless device and a relay signal directed towards a relay node. The wireless device operates in a first area of network coverage and the relay node operates in a second area of the network coverage. The operations also include determining whether the angle between the first formed beam and the relay signal is equal to or is less than a threshold angle. A lobe of the first formed beam interferes with the relay signal when the angle is equal to or is less than the threshold angle. Further, the operations include mitigating interference of the lobe of the first formed beam in response to the angle being equal to or being less than the threshold angle.

BRIEF DESCRIPTION OF THE DRAWINGS

FIGS. 5A and 5B depict another example of a method for minimizing interference in a wireless network, according to embodiments of the present disclosure.

DETAILED DESCRIPTION

Figure 1A:
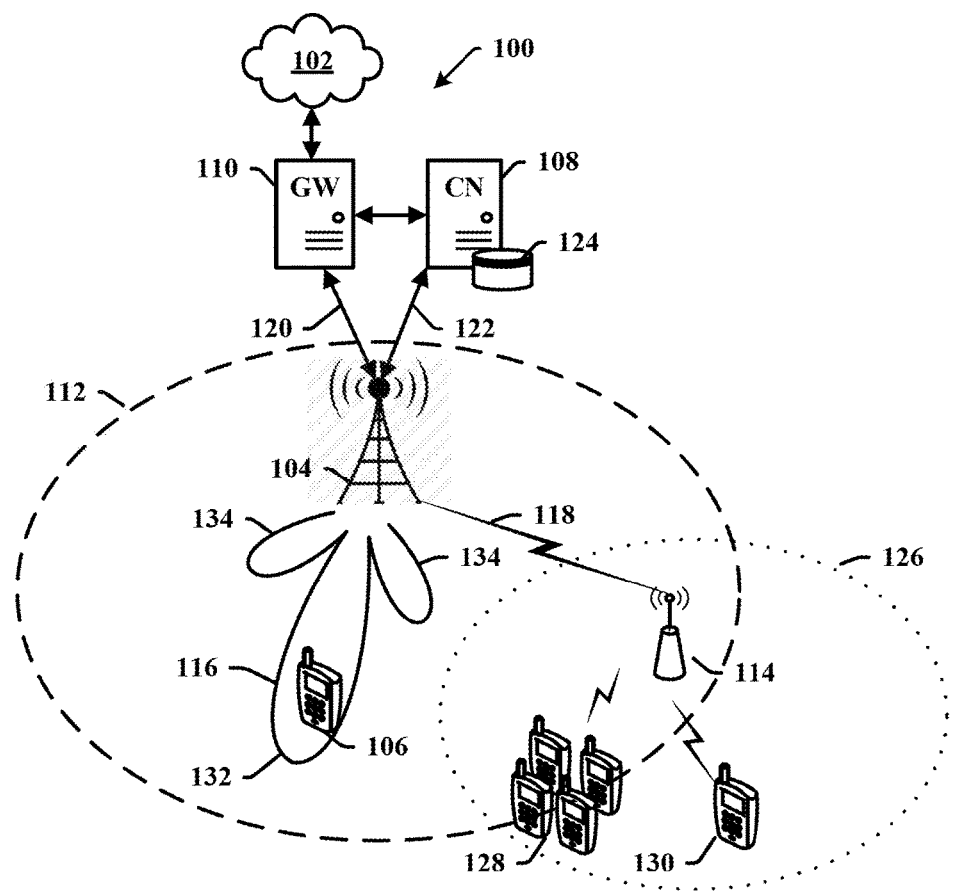
FIGS. 1A-1D depict an example of a system for minimizing interference in a wireless network, according to embodiments of the present disclosure.

In embodiments of the present disclosure, a wireless network can be designed to mitigate interference between wireless devices utilizing the network, in particular, when an access node uses beam forming. As a wireless device subject to beam forming moves around a wireless coverage area provided by the access node, the formed beam directed at the wireless device may interfere with communication signals of other devices. For example, the formed beam can interfere with a relay signal directed towards a relay node that is servicing other wireless devices in the wireless network. When the wireless device and the relay node are in certain positions relative to one another, a side lobe of a formed beam directed towards the wireless device can overlap with, or intersect, a wireless transmission between another the relay node and the access node. The relay node can be in a different sector of wireless coverage area provided by the access node servicing the wireless device, or the relay node can be communicating with a different access node.

To monitor for interference, the access node (or other network system) tracks an angle between the wireless device subject to beam forming and the relay node. As the wireless device moves around the coverage area, the access node (or other network system) determines when the angle between the wireless device and relay node crosses a threshold angle. The threshold angle can define the relative position between the wireless device and relay node where interference occurs between the formed beam and the relay signal. In response, the access node (or other network system) takes action to mitigate the interference. In one example, the access node (or other network system) can disable the formed beam directed at the wireless device and begin using other communication signals with the wireless device. In another example, the access node (or other network system) can switch the relay node to another access node.

The access node (or other network system) can also consider other factors in determining how to mitigate the interference. For example, the access node can determine a number of wireless devices connected to the relay node. The access node can base the mitigation actions on the number of wireless devices connected to the relay node, e.g., disabling the formed beam or switching the relay node to another access node.

By monitor and mitigating interference, the wireless network can utilize beamforming to enhance the coverage and quality of the wireless coverage area without reducing coverage to other wireless devices. As such, the wireless network can adapt to changing conditions in the wireless network to provide flexible and enhanced service to wireless devices. These and additional operations are further described with respect to the embodiments depicted in FIGS. 1A-1D, 2A-2C, 3, 4, 5A, 5B, 6A-6D, and 7 below.

FIGS. 1A-1D depict an example of a communication system 100 for minimizing interference in a wireless network. While FIGS. 1A-1D illustrate various components contained in the communication system 100. FIGS. 1A-1D illustrate one example of a communications system and additional components can be added and existing components can be removed.

As illustrated in FIG. 1A, the communication system 100 includes a communication network 102, an access node 104, one or more wireless devices 106, a controller node 108, and a gateway node 110. Other network elements can be present in the communication system 100 to facilitate communication but are omitted for clarity, such as base stations, base station controllers, mobile switching centers, dispatch application processors, and location registers such as a home location register or visitor location register. Furthermore, other network elements can be present to facilitate communication between the access node 104 and the communication network 102 which are omitted for clarity, including additional processing nodes, routers, gateways, and physical and/or wireless data links for carrying data among the various network elements.

The access node 104 is illustrated as having a coverage area 112, with the wireless device 106 and a relay node 114 being located within the coverage area 106 and accessing network services directly from the access node 104 via an air interface deployed by the access node 104. In embodiments, the access node 104 deploys a formed beam 116 (i.e., using a beamforming operating mode) to communicate with the wireless device 106, and deploys a relay signal 118 to communicate with the relay node 114. In embodiments, the access node 104 (or other network system) is configured to mitigate potential interference between the formed beam 116 and the relay signal 118, as the formed beam 116 tracks the wireless device 106 around the coverage area 112, as further discussed below.

The communication network 102 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). The communication network 102 can be capable of carrying data, for example, to support voice, push-to-talk, broadcast video, and data communications by the wireless device 106, a relay node 114, etc. Wireless network protocols can include multimedia broadcast multicast service (MBMS), code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that can be utilized by the communication network 102 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network 102 can also include additional base stations, controller nodes, telephony switches, internet routers, network gateways, computer systems, communication links, or some other type of communication equipment, and combinations thereof.

The access node 104 can be any network node configured to provide communication between the wireless device 106, the relay node 114, and the communication network 102, including standard access nodes and/or short range, low power, small access nodes. For instance, the access node 104 can include any standard access node, such as a macrocell access node, base transceiver station, a radio base station, an eNodeB device, an enhanced eNodeB device, or the like. In other embodiments, the access node 104 can be a small access node including a microcell access node, a picocell access node, a femtocell access node, or the like such as a home NodeB or a home eNodeB device.

The access node 104 can include a plurality of antennae and transceivers for enabling communication using various operating modes and different frequency bands or carriers and establishing communication links, e.g., the formed beam 116, the relay signal 118, etc., with the wireless device 106, the relay node 114, and the like. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE),—including combinations, improvements, or variations thereof. Moreover, it is noted that while the access node 104 is illustrated in FIG. 1A, any number of access nodes and relay nodes can be implemented within the system 100. For example, the relay node 114 can be communicating with a different access node in the communication system 100.

The access node 104 can include a processor and associated circuitry to execute or direct the execution of computer-readable instructions to perform operations such as those further described herein. Briefly, the access node 104 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. Further, the access node 104 can receive instructions and other input at a user interface. The access node 104 communicates with the gateway node 110 and controller node 108 via communication links 120, 122. The access node 104 can communicate with other access nodes (not shown) using a direct link such as an X2 link or similar link.

The wireless device 106 can be any device, system, combination of devices, or other such communication platform capable of communicating wirelessly with the access node 104 using one or more frequency bands deployed therefrom. The wireless device 106 can be, for example, a mobile phone, a wireless phone, a wireless modem, user equipment (UE), a personal digital assistant (PDA), a voice over internet protocol (VoIP) phone, a voice over packet (VOP) phone, or a soft phone, as well as other types of devices or systems that can exchange audio or data via the access node 104. Other types of communication platforms are possible.

The controller node 108 can be any network node configured to communicate information and/or control information over the communication system 100. The controller node 108 can be configured to transmit control information associated with a handover procedure. The controller node 108 can be a standalone computing device, computing system, or network component, and can be accessible, for example, by a wired or wireless connection, or through an indirect connection such as through a computer network or communication network. For example, the controller node 108 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art will recognize that the controller node 108 is not limited to any specific technology architecture, such as LTE and can be used with any network architecture and/or protocol.

The controller node 108 can include a processor and associated circuitry to execute or direct the execution of computer-readable instructions to obtain information. The controller node 108 can retrieve and execute software from storage, which can include a disk drive, a flash drive, memory circuitry, or some other memory device, and which can be local or remotely accessible. In an example, the controller node 108 includes a database 124 for storing information such as threshold angles for each of a plurality of locations within the coverage area 112, and for each of a plurality of transmission angle of formed beams such as the formed beam 116, as discussed below. This information can be requested by or shared with the access node 104 via the communication links 120, 122, X2 connections, and so on. The software can include computer programs, firmware, or some other form of machine-readable instructions, and can include an operating system, utilities, drivers, network interfaces, applications, or some other type of software, and combinations thereof. The controller node 108 can receive instructions and other input at a user interface.

The gateway node 110 can be any network node configured to interface with other network nodes using various protocols. The gateway node 110 can communicate user data over the communication system 100. The gateway node 110 can be a standalone computing device, computing system, or network component, and can be accessible, for example, by a wired or wireless connection, or through an indirect connection such as through a computer network or communication network. For example, the gateway node 110 can include a serving gateway (SGW) and/or a public data network gateway (PGW), etc. One of ordinary skill in the art will recognize that the gateway node 110 is not limited to any specific technology architecture, such as LTE and can be used with any network architecture and/or protocol.

The gateway node 110 can include a processor and associated circuitry to execute or direct the execution of computer-readable instructions to obtain information. The gateway node 110 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. The gateway node 110 can receive instructions and other input at a user interface.

The communication links 120, 122 can use various communication media, such as air, space, metal, optical fiber, or some other signal propagation path—including combinations, improvements, or variations thereof. The communication links 120, 122 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, GSM, CDMA, WiMAX, or LTE,—including combinations, improvements, or variations thereof. The communication links 120, 122 can include Si communications links. Other wireless protocols can also be used. The communication links 120, 122 can be a direct link or might include various equipment, intermediate components, systems, and networks. The communication links 120, 122 can include many different signals sharing the same link.

The relay node 114 is configured to provide to extend to coverage area 112 of the access node 104 (or other access node). The relay node 114 is illustrated as having a coverage area 126, wireless devices 128, 130 being located within the coverage area 126 and accessing network services from the relay node 114 via an air interface deployed by the relay node 114. The relay node 114 can be configured to function as an intermediary node between the access node 104 (or other access node) and the wireless devices 128, 130. In embodiments, the relay node 114 can be a small access node including a microcell access node, a picocell access node, a femtocell access node, or the like such as a home NodeB or a home eNodeB device.

The relay node 114 communicates with the access node 104 via the relay signal 118. For example, the relay signal 118 can provide a backhaul channel for the wireless devices 128, 130 accessing network services. The relay node 114 can include a plurality of antennae and transceivers for enabling communication using various operating modes and different frequency bands or carriers. The relay signal 118 can be a radio frequency, microwave, infrared, or other similar signal, and can use a suitable communication protocol, for example, GSM, CDMA, WiMAX, or LTE,—including combinations, improvements, or variations thereof. In some embodiments, the access node 104 can utilize a formed beam as the relay signal 118 to the relay node 114.

The relay node 114 can include a processor and associated circuitry to execute or direct the execution of computer-readable instructions to perform operations such as those further described herein. Briefly, the relay node 114 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. Further, the relay node 114 can receive instructions and other input at a user interface. The relay node 114 can communicate with the gateway node 110 and controller node 108 via the access node 104 over the relay signal 118.

Figure 1B:
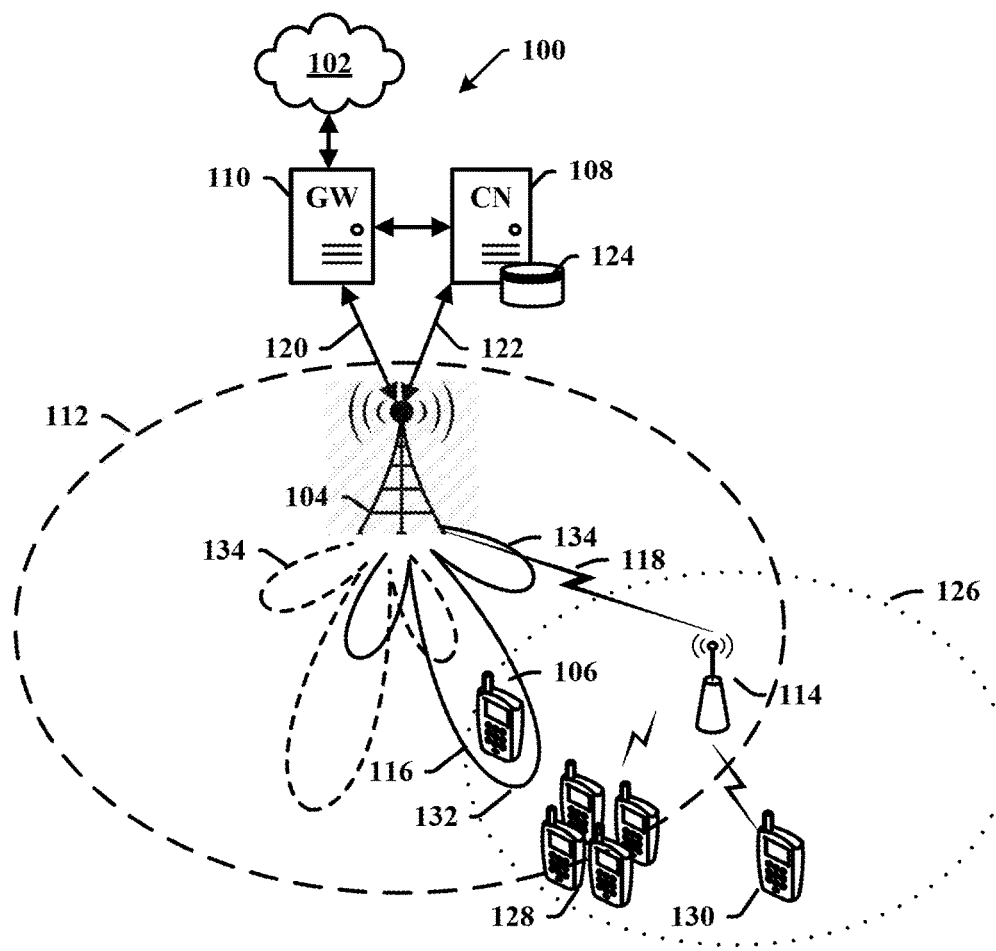

In embodiments, the access node 104 deploys the formed beam 116, directed at the wireless device 106, to establish a communication link with the wireless device 106. The formed beam 116 can include several lobes: a primary lobe 132 directed at the wireless device 106 and secondary lobes 134 at different angles from the primary lobe 132. As illustrated in FIG. 1B, as the wireless device 106 moves, the access node 104 steers the formed beam 116 so that the primary lobe 132 tracks the wireless device 106. As the wireless device 106 moves around the coverage area 112, the formed beam 116 may begin to interfere with other communication links within the coverage area 112. For example, as illustrated in FIG. 1B, as the wireless device 106 moves towards the relay node 114, a portion of the formed beam 116 (e.g., a secondary lobe 134) can interfere with the relay signal 118.

Figure 1C:
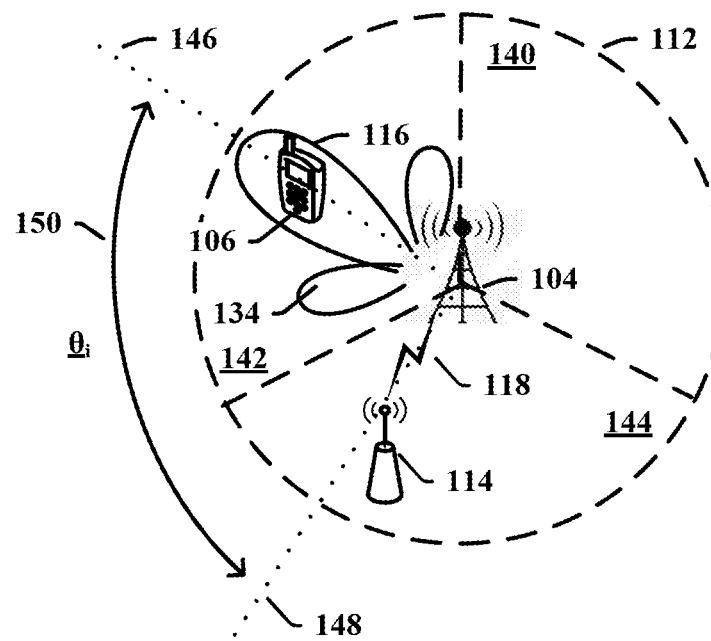

In an example, as further illustrated in FIG. 1C, the coverage area 112 can be defined by different sectors such as sector 140, sector 142, and sector 144. In this example, the wireless device 106 can be located in the sector 142 and subject to beaming forming by the access node 104. The relay node 114 can be located in the sector 144 and communicating with the access node 104 via the relay signal 118. While FIG. 1C illustrates the relay node 114 communicating with the access node 104, the relay node 114 can be located in a sector of the coverage area 112 and communicating with a different access node, but potentially be subject to interference from the formed beam 116.

Figure 1D:
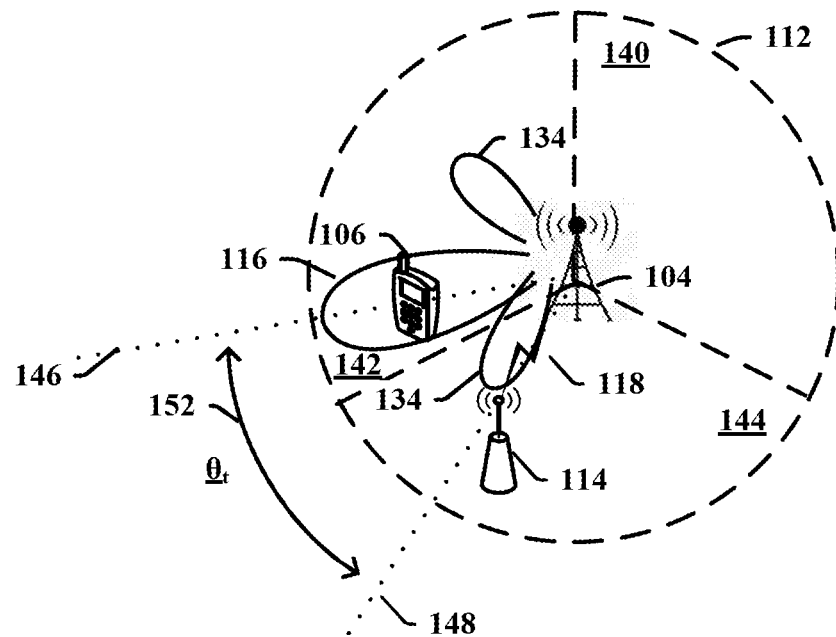

At a given time, i, the wireless device 106 can be positioned at a location 146 relative to the access node 104, and the relay node 114 can be positioned at a location 148 relative to the access node 104. An angle $\theta_i$ 150 can be defined between the location 146 of the wireless device 106 and the location 148 of the relay node 114. At certain locations, for example as illustrated in FIG. 1C, the formed beam 116 directed at the wireless device 106 does not interfere with the relay signal 118 of the relay node 114. As illustrated in FIG. 1D, the location 146 of the wireless device 106 and the location 148 of the relay node 114 can change, for example, as the wireless device 106 moves towards the sector 144. At a threshold location, a portion of the formed beam 116 (e.g., the secondary lobe 134) can interfere with the relay signal 118. A threshold angle $\theta_t$ 152 can be defined between the location 146 of the wireless device 106 and the location 148 of the relay node 114 where a portion of the formed beam 116 (e.g., the secondary lobe 134) begins to interfere with the relay signal 118.

In some embodiments, the threshold angle $\theta_t$ 152 can be based on predetermined characteristics of the formed beam 116, e.g., characteristics of the primary lobe 132 and secondary lobes 134, such as a size that is known for a given antenna configuration of access node 104 and transmission power of formed beam 116. The access node 104 can determine the threshold angle $\theta_t$ 152 based on the predetermined characteristics of the formed beam 116. In some embodiments, the threshold angle $\theta_t$ 152 can be based on measurements of interference between wireless devices in the coverage area 112. For example, the access node 104 can perform test measurements of interference for a formed beam at different angles between wireless devices and determine the threshold angle $\theta_t$ 152 at which interference occurs.

As discussed above, in some embodiments, the angle $\theta_i$ 150 and the threshold angle $\theta_t$ 152 can be defined and measured relative to the location of the wireless device 106 and the relay node 114. In some embodiments, the angle $\theta$ 150 and the threshold angle $\theta_t$ 152 can be defined and measured relative to boundaries between sectors of the coverage area 112, or to any other reference point that can be used by the access node 104. In any embodiment, the threshold angle $\theta_t$ 152 is defined as an angle at which potential interference occurs to the relay signal 118 by a portion of the formed beam 116.

In embodiments, the access node 104 can monitor for interference between the formed beam 116 and the relay signal 118. To monitor for interference, the access node 104 tracks the angle $\theta_i$ 150 between the wireless device 106 and the relay node 114 at different positions or times, i. To track the angle $\theta_i$ 150, the access node 104 can determine the location 146 of the wireless device 106 and the location 148 of the relay node 114. In some embodiments, the access node 104 can determine the location 146 of the wireless device 106 based on the signals, e.g., the formed beam 116, transmitted to and from the wireless device 106. Likewise, the access node 104 can determine the location 148 o the relay node 114 based on the signals, e.g., the relay signal 118, transmitted to and from the relay node 114. For example, the access node 104 can measure the direction and signal strength of the formed beam 116 and the relay signal 118 to determine the location of the wireless device 106 and the relay node 114. In some embodiments, the access node 104 can utilize other information to determine the location 146 of the wireless device 106 and the location 148 of the relay node 114, for example, fixed position of the relay node 114, global positioning system (GPS) data from the wireless device 106 and the relay node 114, other location information, and combinations thereof. Based on the location 146 of the wireless device 106 and the location 148 of the relay node 114, the access node 104 can calculate the angle $\theta_i$ 150 between the wireless device 106 and the relay node 114.

In embodiments, as the wireless device 106 (or the relay node 114) moves around the coverage area 112, the access node 104 periodically or continually determines the angle $\theta_i$ 150 between the location 146 of the wireless device 106 and the location 148 of the relay node 114, for example, while the wireless device 106 or the relay node 114 are active in the coverage area 112. As the angle $\theta_i$ 150 is determined, the access node 104 compares the angle $\theta_i$ 150 with the threshold angle $\theta_t$ 152. To mitigate potential interference, the access node 106 can determine when the angle $\theta$, 150 crosses the threshold angle $\theta_t$ 152. For example, the access node 106 can determine when the angle $\theta_i$ 150 becomes less than or equal to the threshold angle $\theta_t$ 152. In response, the access node 104 takes action to mitigate the interference. In some embodiments, the access node 104 can disable the formed beam 116 directed at the wireless device 106 and begin using other communication signals with the wireless device 106. In some embodiments, the access node 104 can switch the relay node 114 to a new access node.

In embodiments, after the mitigation action is taken, the access node 104 continues to monitor the angle $\theta_i$ 150 between the location 146 of the wireless device 106 and the location 148 of the relay node 114, for example, while wireless device 106 or the relay node 114 are active in the coverage area 112. The access node 104 compares the angle $\theta_i$ 150 with the threshold angle $\theta_t$ 152. If the angle $\theta_i$ 150 crosses back across the threshold angle $\theta_t$ 152, the access node 104 can return to an operating state used prior to the mitigation action. For example, the access node 104 can determine when the angle $\theta_i$ 150 becomes greater than the threshold angle $\theta_t$ 152. In some embodiments, the access node 104 can re-enable the formed beam 116 directed at the wireless device 106. In some embodiments, the access node 104 can switch the relay node 114 back to the access node 104.

In embodiments, the access node 104 can also consider other factors in determining how to mitigate the interference. For example, the access node 104 can determine a number of wireless devices 128, 130 connected to the relay node 114. The access node 104 can base the mitigation actions on the number of wireless devices 128, 130 connected to the relay node 114. The number of wireless device can represent any wireless devices, for example, wireless devices 128, 130, using the relay node 114 to communicate with the communication network 102. In some embodiments, the access node 104 can disable the formed beam 116 when the number of wireless devices 128, 130 is greater than or equal to a threshold limit of wireless devices. In some embodiments, the access node can switch the relay node to another access node when the number of wireless devices 128, 130 is less than the threshold limit of wireless devices. The threshold limit can be based any number of factors such as quality of service, weighting factors of number of wireless devices affected, availability of access nodes for switching, priority of the relay node 114, and like.

In some embodiments, other mitigation action can be taken by the access node 104. For example, an operating mode of the wireless device 106 and/or the relay node 114 can be altered. For example, the access node 104 can cause the operating mode of the wireless device 106 and/or the relay node 114 to be switched from a default mode to an aggregated mode, i.e., a mode utilizing carrier aggregation, from one communication protocol to another communication protocol, and the like.

In the embodiments and examples described above, the access node 104 is described as performing the operations of mitigating interference. In any of the embodiments and examples, however, other elements of the communication network 100 can perform any portion of the process described above.

Other network elements can be present in the communication system 100 to facilitate communication but are omitted for clarity, such as base stations, base station controllers, mobile switching centers, dispatch application processors, and location registers such as a home location register or visitor location register. Furthermore, other network elements that are omitted for clarity can be present to facilitate communication, such as additional processing nodes, routers, gateways, and physical and/or wireless data links for carrying data among the various network elements, e.g. between the access node 104 and the communication network 102.

Figure 2A:
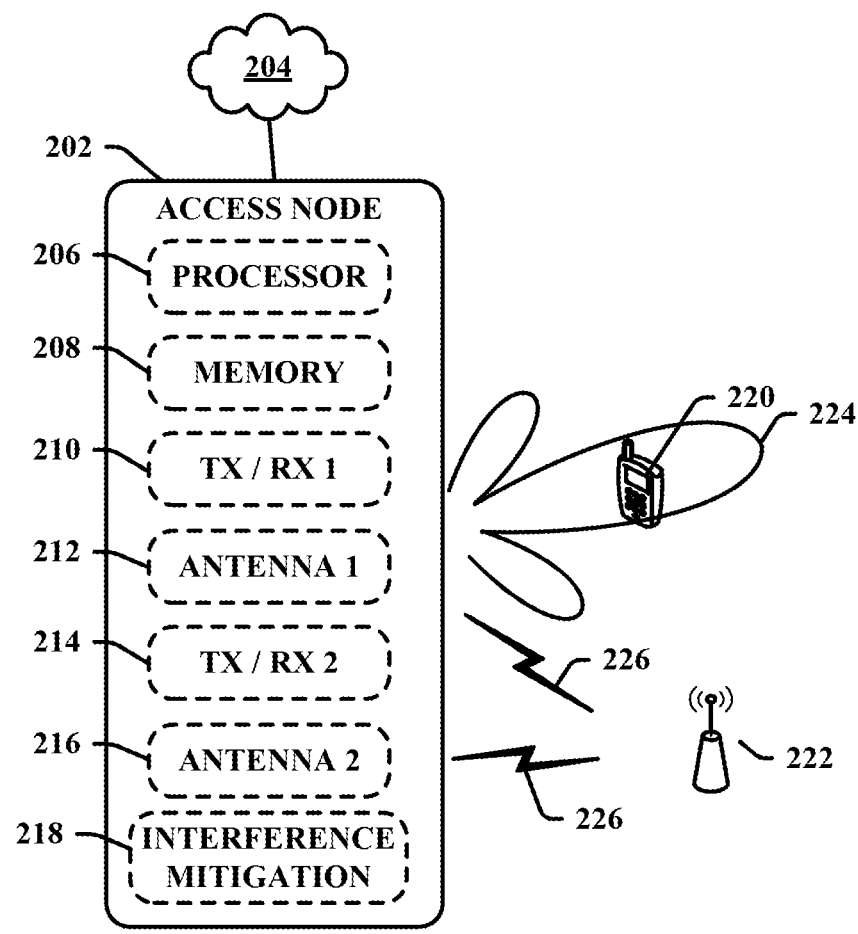
FIG. 2A depicts an example of an access node in a system for minimizing interference in a wireless network, according to embodiments of the present disclosure.

FIG. 2A depicts components of an example of an access node 202 coupled to and communicating with a communication network 204. For example, the access node 202 and communication network 204 can be an example of the access node 104 and communication network 102, as illustrated in FIGS. 1A-1D. In this example, the access node 202 includes a processor 206, a memory 208, a first transceiver 210, a first antenna 212, a second transceiver 214, and a second antenna 216. The access node 202 can also include an interference mitigation unit 218 for performing the processes described herein.

As illustrated, the first transceiver 210, first antenna 212, second transceiver 214, and second antenna 216 can provide communication signals to provide an air link with a wireless device 220 and a relay node 222. For example, the wireless device 220 and relay node 222 can be an example of the wireless device 106 and relay 114, as illustrated in FIGS. 1A-1D. The antenna 212 can be used to deploy a formed beam 224 to communicate with the wireless device 220, and a relay signal 226 to communicate with the relay node 222. The antenna 216 can also be used to deploy the relay signal 226 to communicate with the relay node 222. It should be understood that each antenna 214, 216 can comprise a plurality of antennae or antennae arranged in one or more arrays.

As discussed above, a portion of the formed beam 224 (e.g., a lobe of the formed beam 224) can interfere with the relay signal 226 to the relay node 222. In embodiments, the interference mitigation unit 218 can be configured to monitor an angle between the wireless device 220 and the relay node 222 and determine when the angle between the wireless device 220 and the relay node 222 becomes equal to or less than a threshold angle, which represents an angle at which a portion of the formed beam 224 interferes with the relay signal 226. In response to the angle between the wireless device 220 and the relay node 222 becoming equal to or less than a threshold angle, the interference mitigation unit 218 can be configured to mitigate the interference caused by the formed beam 224. In one example, to mitigate the interference, the interference mitigation unit 218 can be configured to disable the formed beam 224 and switch to a regular cellular communication link to communicate with the wireless device 224. In another example, to mitigate the interference, the interference mitigation unit 218 can be configured to switch (or hand-off) the communication link (e.g., the relay signal 226) to another access node.

In embodiments, the interference mitigation unit 218 can select a mitigation process based on a number of user equipment connected to or communicating with the relay 222. For example, if a threshold number of wireless devices are communicating with the relay node 222, the interference mitigation unit 218 can be configured to disable the formed beam 224 and switch to a regular cellular communication link to communicate with the wireless device 224. Likewise, for example, if a threshold number of wireless devices are not communicating with the relay node 222, the interference mitigation unit 218 can be configured to switch (or hand-off) the communication link (e.g., the relay signal 226) to another access node.

In embodiments, the interference mitigation unit 218 can be implemented as hardware, software, or combinations thereof. In one example, the interference mitigation unit 218 can be implemented as a software program or module that includes logical instructions for performing the process described herein. In this example, a copy of the interference mitigation unit 218 can be stored in memory 208 and the logical instructions of the interference mitigation unit 218 can be executed by processor 206.

In another example, the interference mitigation unit 218 can be implemented as a hardware unit contain within or coupled to the access node 202. In this example, the interference mitigation unit 218 can include one or more processors and associated circuitry to execute or direct the execution of computer-readable instructions to perform operations and processes as described herein. The interference mitigation unit 218 can retrieve and execute software, which includes logical instructions for performing the process described herein, from storage. The storage can include a disk drive, a flash drive, memory circuitry, or some other memory device, and which can be local or remotely accessible. The software can comprise computer programs, firmware, or some other form of machine-readable instructions, and can include an operating system, utilities, drivers, network interfaces, applications, or some other type of software, including combinations thereof.

While FIG. 2A illustrates the interference mitigation unit 218 being a part of the access node 202, the interference mitigation unit 218 can be a part of another device or system communicating with the access node 202. Likewise, the interference mitigation unit 218 can be a stand-alone system or device that communicates with the access node 202.

Figure 2B:
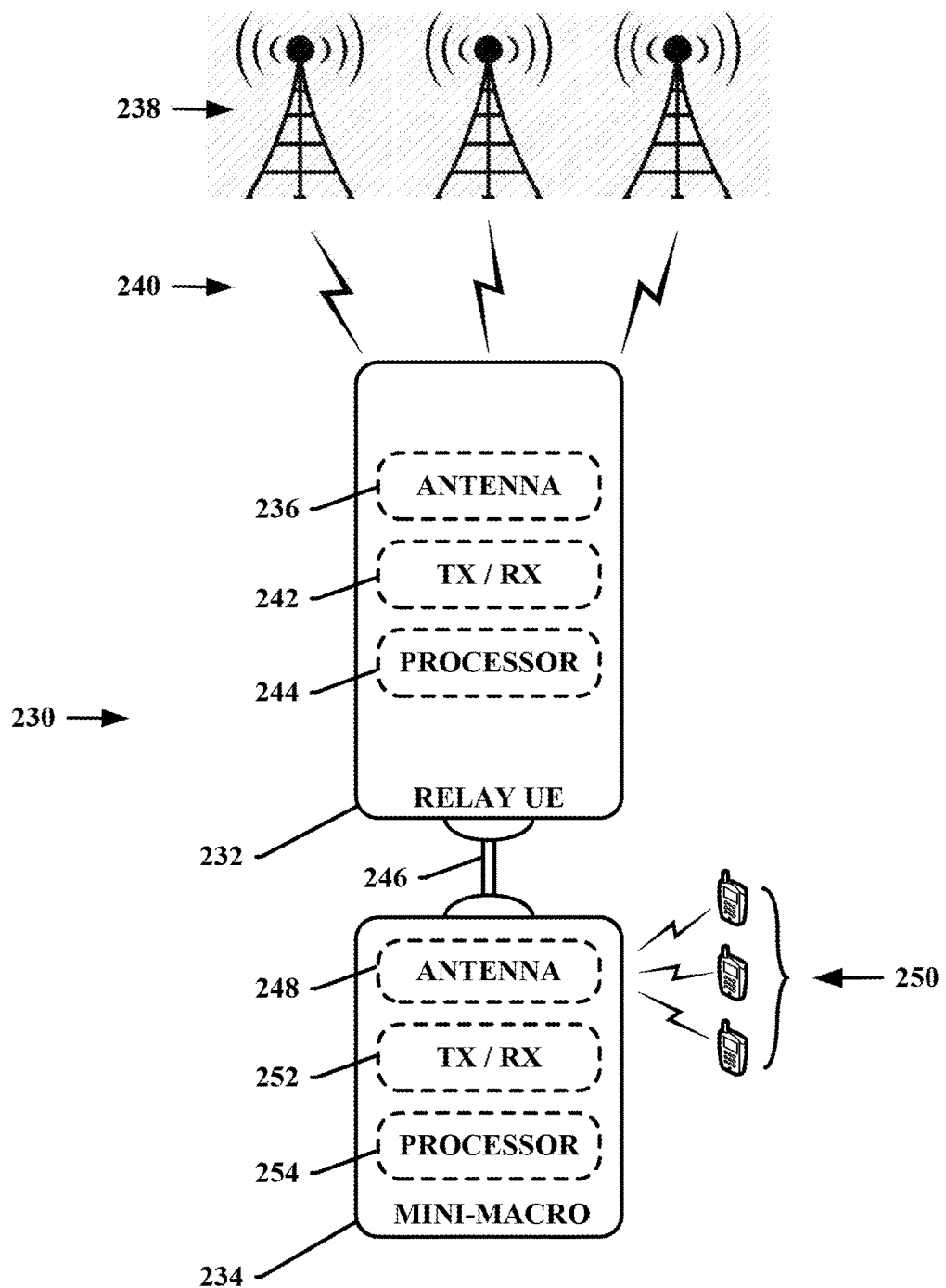
FIGS. 2B and 2C depict examples of relay nodes in a system for minimizing interference in a wireless network, according to embodiments of the present disclosure.

FIG. 2B depicts an example of a relay node 230, which includes a relay wireless device 232 coupled to a mini-macro access node 234. The relay wireless device 232 can include an antenna 236 for direct (i.e., unrelayed) communication with one or more of access nodes 238 via communication links 240, a transceiver 242, and a processor 244. For example, the relay node 230 and the communication links 240 can be an example of the relay node 114 and the relay signal 118, as illustrated in FIGS. 1A-1D. Further, the relay wireless device 232 is coupled to the mini-macro access node 234 via a communication interface 246. The communication interface 246 can be any interface that enables direct communication between the relay wireless device 232 and the mini-macro access node 234, such as USB, FireWire, or any other serial, parallel, analog, or digital interface. The mini-macro access node 234 can include an antenna 248 for wireless communication with one or more wireless devices 250, a transceiver 252, and a processor 254. Although only one transceiver is depicted in each of the relay wireless device 232 and the mini-macro access node 234, additional transceivers can be incorporated in order to facilitate communication across the communication interface 246 and other network elements.

Figure 2C:
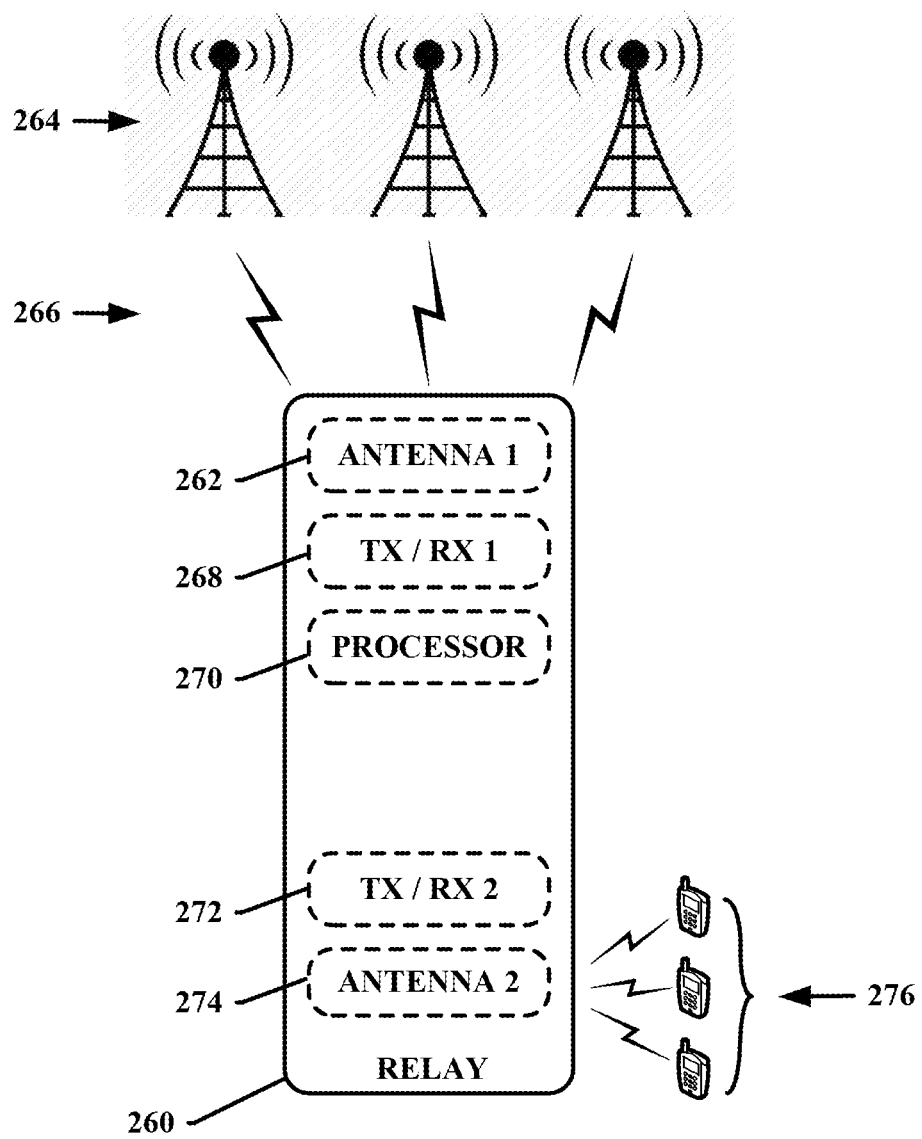

FIG. 2C depicts an example of a relay node 260. The relay node 260 includes a first antenna 262 for direct communication with one or more of access nodes 264 via a communication links 266, a first transceiver 268, and a processor 270. For example, the relay node 260 and the communication links 266 can be an example of the relay node 114 and the relay signal 118, as illustrated in FIGS. 1A-1D. The relay node 260 also includes a second transceiver 272 and a second antenna 274 for wireless communication with one or more wireless devices 276. Although only two transceivers are depicted in the relay node 260, additional transceivers can be incorporated in order to facilitate communication with other network elements.

Figure 3:
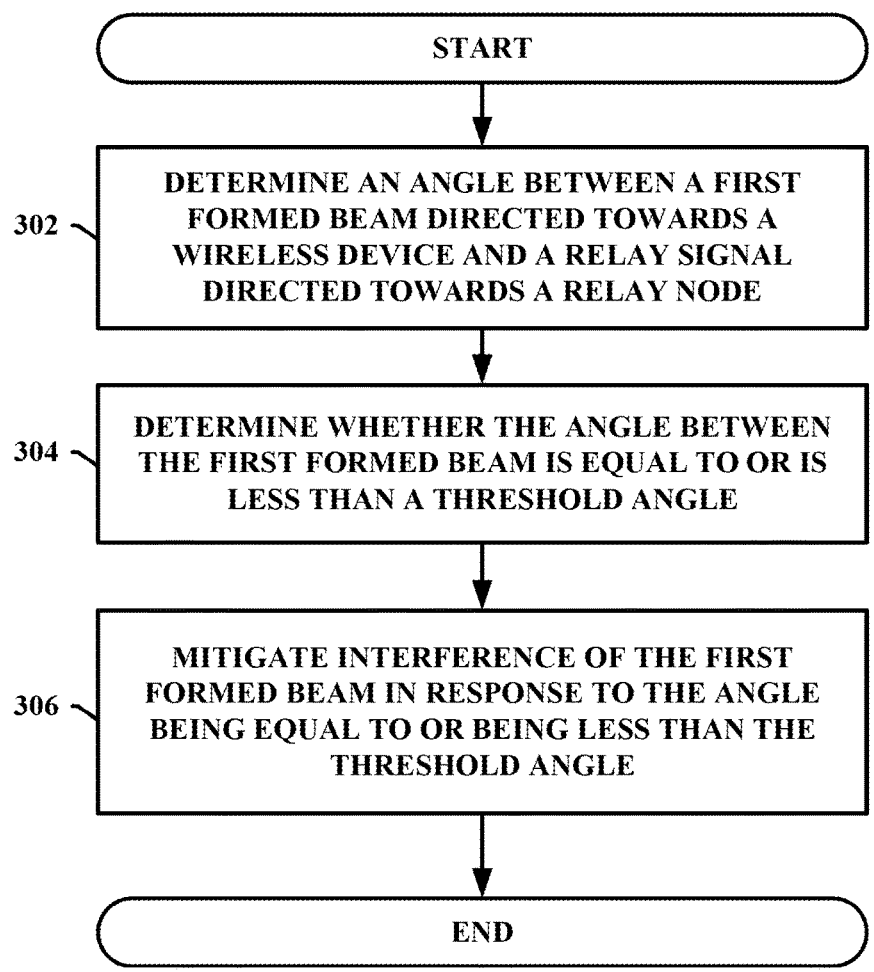
FIG. 3 depicts an example of a method for minimizing interference in a wireless network, according to embodiments of the present disclosure.

FIG. 3 depicts an example of a method 300 for minimizing interference in a wireless network. The method 300 of FIG. 3 can be implemented in any network node such as the access node 104. In other embodiments, the method 300 can be implemented with any suitable network element, for example, any network element illustrated in FIG. 1 or FIGS. 2A-2C. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the method 300 begins, in 302, an angle between a first formed beam directed towards a wireless device and a relay signal directed towards a relay node is determined. In some embodiments, the angle can be defined as the angle between the location of the wireless device and the location of the relay node. In some embodiments, the angle between the first formed beam directed towards the wireless device and the relay signal directed towards the relay node can be determined based on the signals transmitted to and from the wireless device and the relay node, GPS data for the wireless device and the relay node, known fixed position of the relay node, other location information, and combinations thereof.

For example, referring to FIGS. 1A-1D, as the wireless device 106 (or the relay node 114) moves around the coverage area 112, the access node 104 can periodically or continually determine the angle $\theta_i$ 150 between the location 146 of the wireless device 106 and the location 148 of the relay node 114, for example, while the wireless device 106 or the relay node 114 are active in the coverage area 112.

In 304, it can be determined whether the angle between the first formed beam and the relay signal is equal to or is less than a threshold angle. In some embodiments, the threshold angle can be defined as an angle at which potential interference occurs to the relay signal by a portion of the formed beam. In some embodiments, the angle between the first formed beam and the relay signal can be compared to the threshold angle.

For example, referring to FIGS. 1A-1D, as the angle $\theta_i$ 150 is determined at different positions or times, i, the access node 104 can compare the angle $\theta_i$ 150 with the threshold angle $\theta_t$ 152. The access node 104 can continuously or periodically determine and compare the angle $\theta_i$ 150 to the threshold angle $\theta_t$ 152, while the wireless device 106 and/or the relay node 114 are active in the coverage area 112.

In 306, interference of the first formed beam can be mitigated in response to the angle being equal to or being less than the threshold angle. In some embodiments, a mitigation action can be taken that disables the first formed beam directed to the wireless device and enables different communications signals with the wireless device. In some embodiments, a mitigation action can be taken that switches the relay node to a new access node from the access node currently communicating with the relay node. In some embodiments, the new access node can be selected such that a new relay signal to the new access node does not interfere with the formed beam.

For example, referring to FIGS. 1A-1D, the access node 106 can determine when the angle $\theta_i$ 150 crosses the threshold angle $\theta_t$ 152. For example, the access node 106 can determine when the angle $\theta_i$ 150 becomes less than or equal to the threshold angle $\theta_t$ 152. In response, the access node 104 takes action to mitigate the interference. In some embodiments, the access node 104 can disable the formed beam 116 directed at the wireless device 106 and begin using other communication signals with the wireless device 106. In some embodiments, the access node 104 can switch the relay node 114 to another access node.

Figure 4:
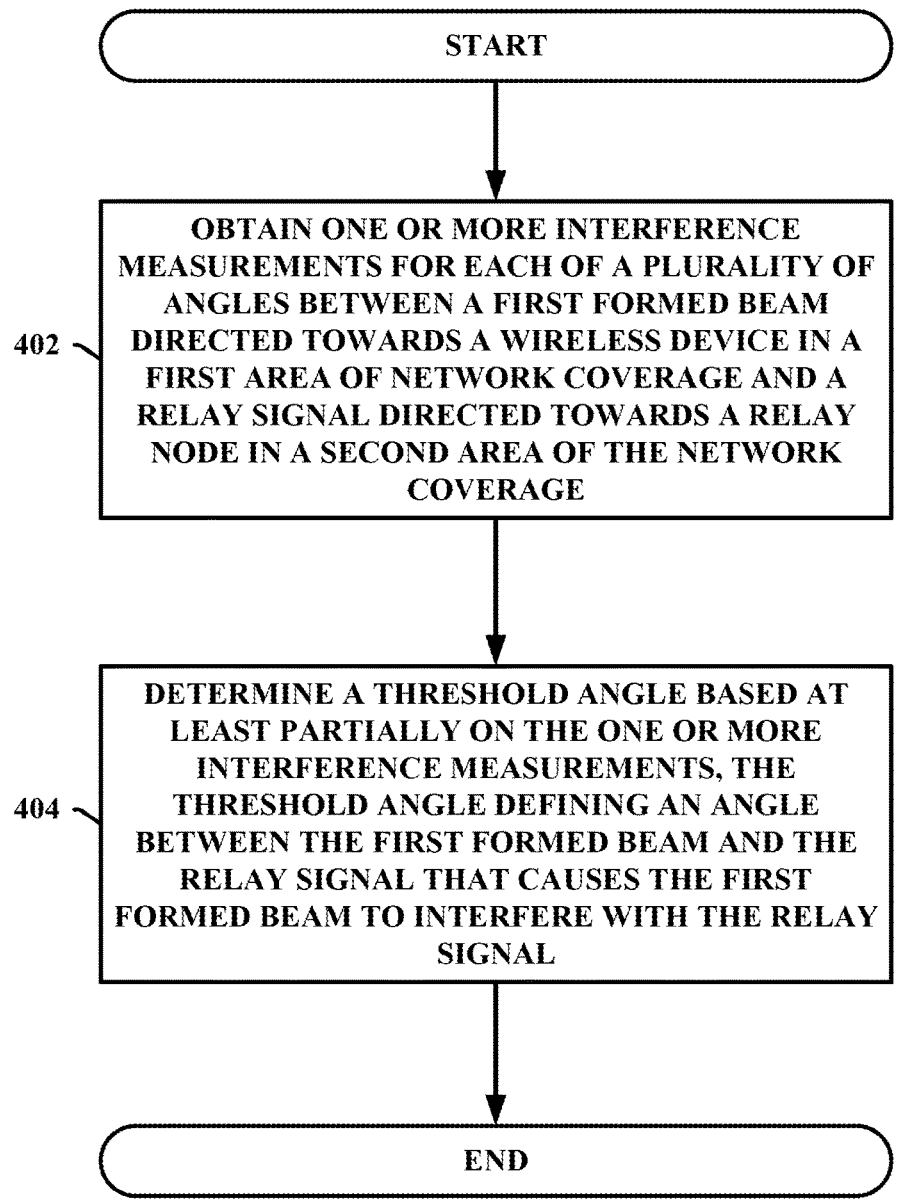
FIG. 4 depicts an example of a method for determining a threshold angle for minimizing interference in a wireless network, according to embodiments of the present disclosure.

FIG. 4 depicts an example of a method 400 for minimizing interference in a wireless network. The method 400 of FIG. 4 can be implemented in any network node such as the access node 104. In other embodiments, the method 400 can be implemented with any suitable network element, for example, any network element illustrated in FIG. 1 or FIGS. 2A-2C. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the method 400 begins, in 402, one or more interference measurements are obtained for each of a plurality of angles between a first formed beam directed towards a wireless device in a first area of network coverage and a relay signal directed towards a relay node in a second area of the network coverage. In some embodiments, the threshold angle can be based on predetermined characteristics of the lobe, such as a size of the lobe of the first formed beam. The size of the lobe can be predetermined based on an antenna configuration of an access node deploying the formed beam. For example, a given antenna configuration and known transmit power, a lobe size can be predetermined and/or specified by a manufacturer of a sectorized antenna for a plurality of different transmission angles.

In some embodiments, the threshold angle can further be based on interference measurements for each of the plurality of transmission angles. For example, the interference measurements may be performed at a fixed location in a neighboring sector as the transmission angle of the formed beam is varied in its own sector. As the lobe of the formed beam causes various levels of interference, depending on its size and other characteristics (as described above), a range of angles can be determined as causing interference to wireless devices at the fixed locations.

In 404, a threshold angle is determined based at least partially on the one or more interference measurement, the threshold angle defining an angle between the first formed beam and the relay signal that causes the first formed beam to interfere with the relay signal.

For example, the threshold angle $\theta_t$ 152 can be based on predetermined characteristics of the formed beam 116, e.g., characteristics of the primary lobe 132 and secondary lobes 134, such as a size that is known for a given antenna configuration of access node 104 and transmission power of formed beam 116. The access node 104 can determine the threshold angle $\theta_t$ 152 based on the predetermined characteristics of the formed beam 116. In some embodiments, the threshold angle $\theta_t$ 152 can be based on measurements of interference between wireless devices in the coverage area 112. For example, the access node 104 can perform test measurements of interference for a formed beam at different angles between wireless devices and determine the threshold angle $\theta_t$ 152 at which interference occurs.

Figure 5A:
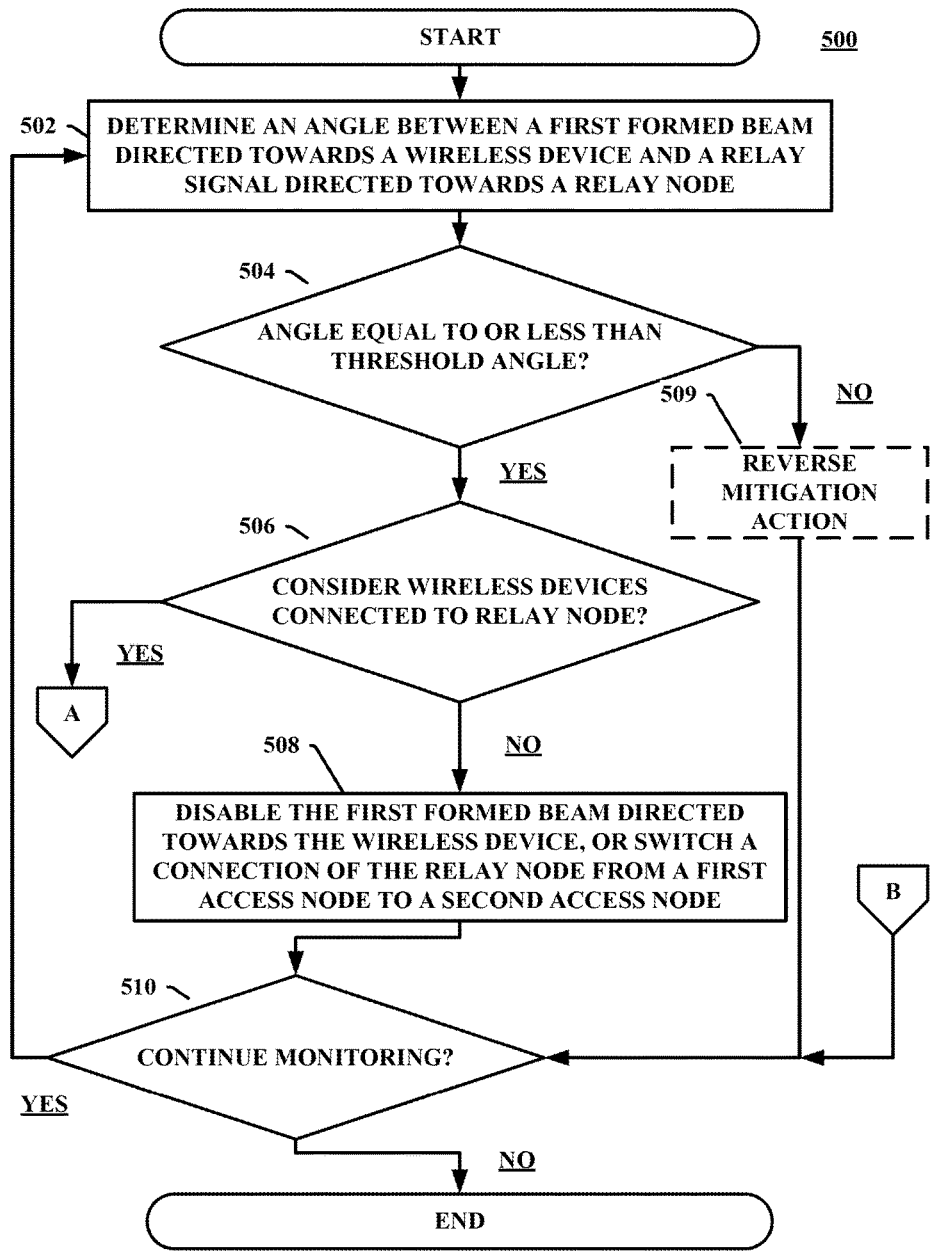

FIGS. 5A and 5B depict an example of a method 500 for minimizing interference in a wireless network. The method 500 of FIGS. 5A and 5B can be implemented in any network node such as the access node 104. In other embodiments, the method 500 can be implemented with any suitable network element, for example, any network element illustrated in FIG. 1 or FIGS. 2A-2C. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the method 500 begins, in 502, an angle between a first formed beam directed towards a wireless device and a relay signal directed towards a relay node is be determined. In some embodiments, the angle can be defined as the angle between the location of the wireless device and the location of the relay node. In some embodiments, the angle between the first formed beam directed towards the wireless device and the relay signal directed towards the relay node can be determined based on the signals transmitted to and from the wireless device and the relay node, GPS data for the wireless device and the relay node, known fixed position of the relay node, other location information, and combinations thereof.

Figure 6A:
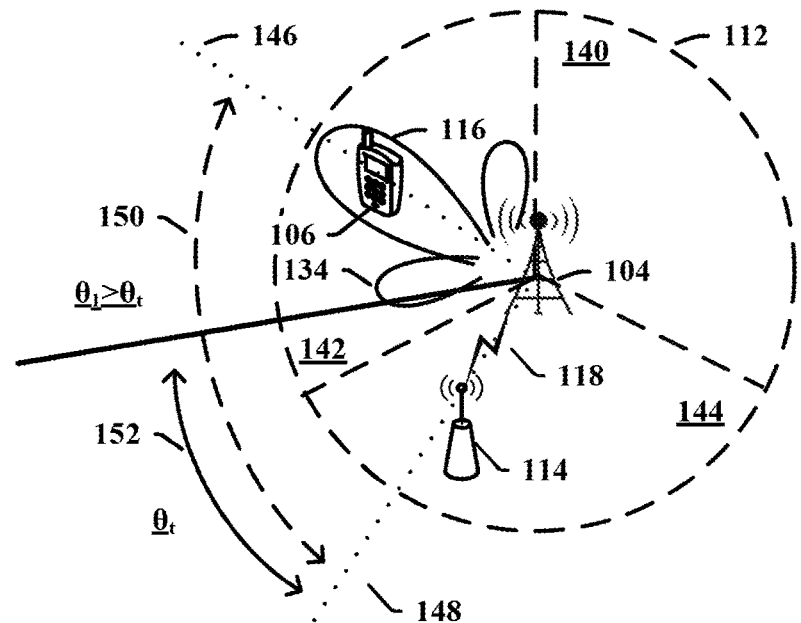
FIGS. 6A-6C depict an example of wireless devices in a system for minimizing interference in a wireless network, according to embodiments of the present disclosure
Figure 6B:
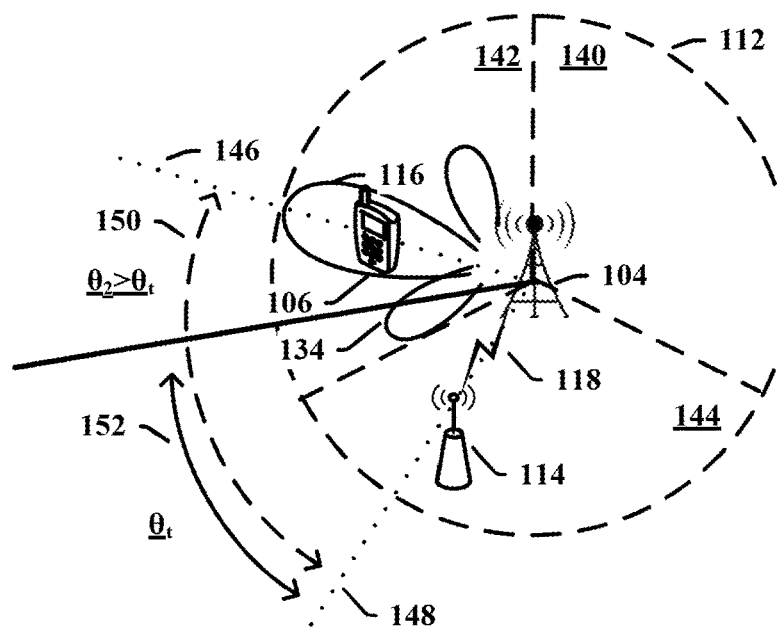

For example, as illustrated in FIG. 6A, at position or time, 1, the access node 104 can determine the location 146 of the wireless device 106 and the location 148 of the relay node 114. For instance, the access node 104 can determine the location 146 of the wireless device 106 based on the signals, e.g., the formed beam 116, transmitted to and from the wireless device 106. Likewise, for instance, the access node 104 can determine the location 148 of the relay node 114 based on the signals, e.g., the relay signal 118, transmitted to and from the relay node 114. For example, the access node 104 can measure the direction and signal strength of the formed beam 116 and the relay signal 118 to determine the location of the wireless device 106 and the relay node 114. The access node 104 can also utilize other information to determine the location 146 of the wireless device 106 and the location 148 of the relay node 114, for example, fixed position of the relay node 114, GPS data from the wireless device 106 and the relay node 114, other location data, and combinations thereof. Based on the location 146 of the wireless device 106 and the location 148 of the relay node 114, the access node 104 can calculate the angle $\theta_1$ 150 between the wireless device 106 and the relay node 114 at the position or time, 1.

In 504, it is determined whether the angle is equal to or less than a threshold angle. In some embodiments, the threshold angle can be defined as an angle at which potential interference occurs to the relay signal by a portion of the formed beam. In some embodiments, the angle between the first formed beam and the relay signal can be compared to the threshold angle. For example, referring to FIG. 6A, at position or time, 1, as the angle $\theta_1$ 150 is determined, the access node 104 compares the angle $\theta_1$ 150 with the threshold angle $\theta_t$ 152.

If the angle is greater than the threshold angle, the method 500 proceeds to 509 and 510. For example, referring to FIG. 6A, the access node 104 can determine that the angle $\theta_1$ 150 is greater than the threshold angle $\theta_t$ 152, i.e., $\theta_1 > \theta_t$. In 510, it is determined whether to continue monitoring. For example, referring to FIG. 6B, the access node 104 can periodically or continually determine the angle $\theta_i$ 150 between the location 146 of the wireless device 106 and the location 148 of the relay node 114, for example, while the wireless device 106 or the relay node 114 are active in the coverage area 112.

If monitoring does not continue, the method 500 can end. If monitoring continues, the method 500 returns to 502 and the method 500 repeats. At position or time, 2, the access node 104 can determine the location 146 of the wireless device 106 and the location 148 of the relay node 114. Based on the location 146 of the wireless device 106 and the location 148 of the relay node 114, the access node 104 can calculate the angle $\theta_2$ 150 between the wireless device 106 and the relay node 114 at the position or time, 2. The access node 104 can determine that the angle $\theta_2$ 150 is greater than the threshold angle $\theta_t$ 152, i.e., $\theta_2 > \theta_t$.

Figure 6C:
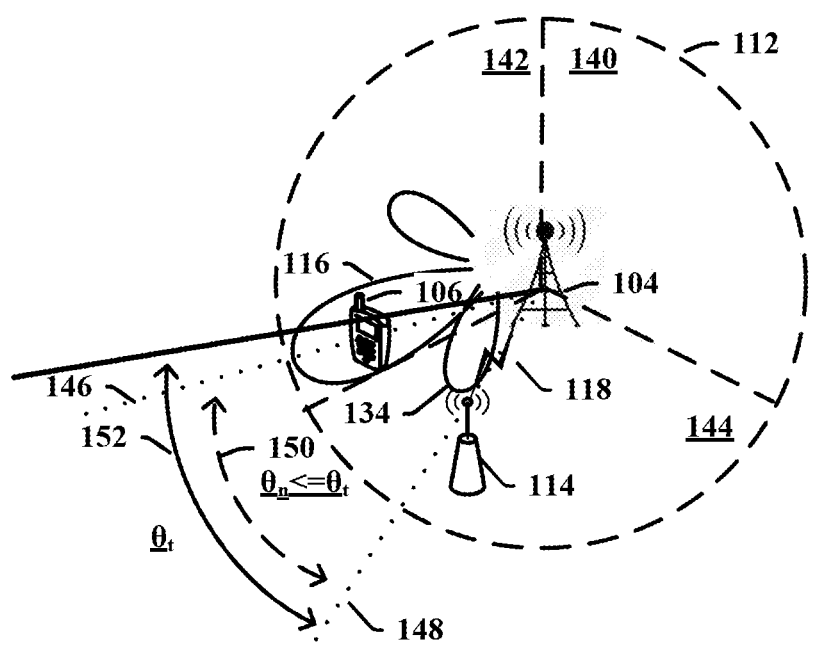

If the angle is equal to or less than the threshold angle, in 506, it is determined whether wireless devices connected to the relay node are to be considered. For example, as illustrated in FIG. 6C, at position or time, n, the access node 104 can determine the location 146 of the wireless device 106 and the location 148 of the relay node 114. Based on the location 146 of the wireless device 106 and the location 148 of the relay node 114, the access node 104 can calculate the angle $\theta_n$ 150 between the wireless device 106 and the relay node 114 at the position or time, n. The access node 104 can determine that the angle $\theta_n$ 150 is less than or equal to the threshold angle $\theta_t$ 152, i.e., $\theta_n <= \theta_t$.

If the wireless devices connected to the relay node are not considered, in 508, the first formed beam directed towards the wireless device is disabled, or a connection of the relay node is switched from a first access node to a second access node. In some embodiments, the formed beam directed to the wireless device can be disabled and different communications signals can be enabled. In some embodiments, a mitigation action can be taken that switches the relay node to a new access node from the access node currently communicating with the relay node. In some embodiments, the new access node can be selected such that a new relay signal to the new access node does not interfere with the formed beam.

For example, the access node 106 can determine when the angle $\theta_n$ 150 becomes less than or equal to the threshold angle $\theta_t$ 152. In response, the access node 104 takes action to mitigate the interference. In some embodiments, the access node 104 can disable the formed beam 116 directed at the wireless device 106 and begin using other communication signals with the wireless device 106. In some embodiments, the access node 104 can switch the relay node 114 to a new access node.

If the wireless devices connected to the relay node are considered, the method 500 proceeds to 512, as illustrated in FIG. 5B. In 512, a number of wireless devices connected to the relay node is determined. The number of wireless device can represent any wireless devices using the relay node to communicate with the wireless network. For example, the access node 104 can determine a number of wireless devices 128, 130 connected to the relay node 114.

In 514, it is determined whether the number of wireless devices is greater than or equal to a threshold limit. The threshold limit can represent a threshold number of wireless devices using the relay that indicates the relay node should not be switched to a new access node. The threshold limit can be based any number of factors such as quality of service, weighting factors of number of wireless devices affected, availability of access nodes for switching, priority of the relay node, and like.

If the number of wireless devices is less than the threshold limit, in 516, a connection of the relay node can be switched from a first access node to a second access node. For example, the access node 104 can switch the relay node 114 to another access node.

In 518, the first formed beam directed towards the wireless device can optionally be enabled. For example, the access node 104 may have previously disabled the formed beam 116 due to the number of wireless devices 128, 130 connected to the relay node 114 being greater than or equal to the threshold limit (or due to other mitigation action). As the number of wireless devices 128, 130 drops below the threshold limit, the access node 104 can optionally re-enable the formed beam 116 directed at the wireless device 106.

If the number of wireless devices is greater than or equal to the threshold limit, in 520, the first formed beam directed towards the wireless device is disabled. For example, the access node 104 can disable the formed beam 116 directed at the wireless device 106 and begin using other communication signals with the wireless device 106.

In 522, a connection of the relay node can optionally be switched from the second access node to the first access node. For example, the access node 104 may have previously switched the relay node to a new access node due to the number of wireless devices 128, 130 connected to the relay node 114 being less than the threshold limit (or due to other mitigation action). As the number of wireless devices 128, 130 increases to greater than or equal to the threshold limit, the access node 104 can switch the relay node from the new access node back to the access node 104.

Returning to FIG. 5A, after 504, in 509, any mitigation action can optionally be reversed. For example, after the mitigation action is taken, the access node 104 continues to monitor the angle $\theta_i$ 150 between the location 146 of the wireless device 106 and the location 148 of the relay node 114, for example, while the wireless device 106 or the relay node 114 are active in the coverage area 112. The access node 104 compares the angle $\theta_i$ 150 with the threshold angle $\theta_t$ 152 for any position or time, n. If the angle $\theta_i$ 150 crosses back across the threshold angle $\theta_t$ 152, the access node 104 can return to an operating state used prior to the mitigation action. For example, the access node 106 can determine when the angle $\theta_i$ 150 becomes greater than the threshold angle $\theta_t$ 152. In some embodiments, the access node 104 can re-enable the formed beam 116 directed at the wireless device 106. In some embodiments, the access node 104 can switch the relay node 114 back to the access node 104.

The methods, systems, devices, networks, access nodes, and equipment described above can be implemented with, contain, or be executed by one or more computer systems and/or processing nodes. The methods described above can also be stored on a non-transitory computer readable medium. Many of the elements described herein can be, comprise, or include computers systems and/or processing nodes. This includes, but is not limited to: the access node 104, the controller node 108, the gateway node 110, the wireless device 106, the relay node 114, and/or the network 102.

Figure 7:
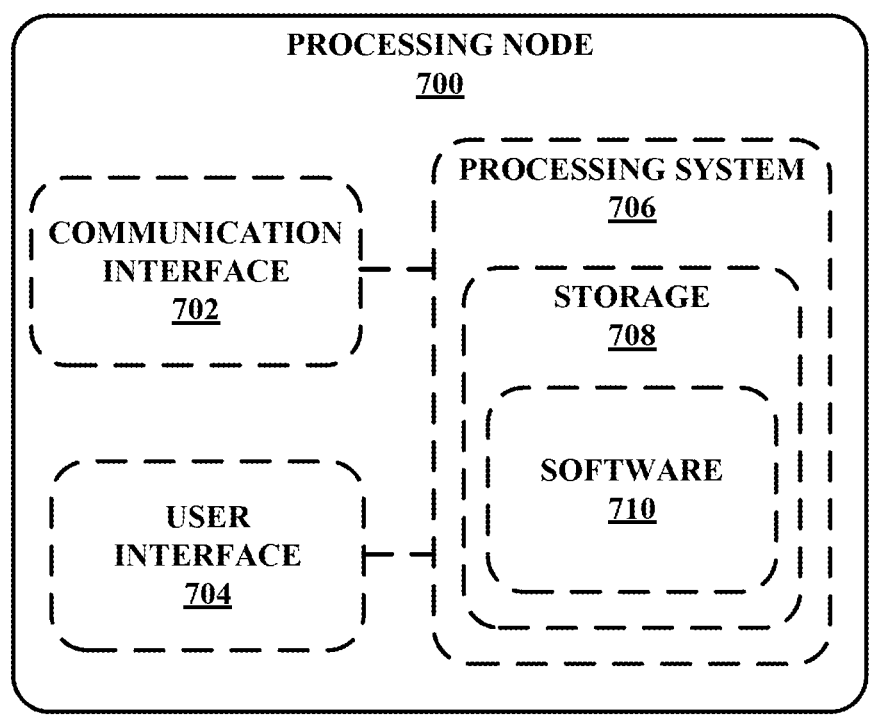
FIG. 7 depicts an example of a processing node for minimizing interference in a wireless network, according to embodiments of the present disclosure.

FIG. 7 depicts an example of a processing node 700. The processing node 700 includes a communication interface 702, a user interface 704, and a processing system 706 in communication with the communication interface 702 and the user interface 704. The processing system 706 includes storage 708, which can comprise a disk drive, flash drive, memory circuitry, or other memory device. The storage 708 can store software 710, which is used in the operation of the processing node 700. The storage 708 can include a disk drive, flash drive, data storage circuitry, or some other memory apparatus. For example, the storage 708 can include a buffer. The software 710 can include computer programs, firmware, or some other form of machine-readable instructions, including an operating system, utilities, drivers, network interfaces, applications, or some other type of software. For example, the software 710 can include instructions to implement the interference mitigation unit 218, as described above. The processing system 706 can include a microprocessor and other circuitry to retrieve and execute the software 710 from the storage 708. The processing node 706 can further include other components such as a power management unit, a control interface unit, etc., which are omitted for clarity. The communication interface 702 permits the processing node 700 to communicate with other network elements. The user interface 704 permits the configuration and control of the operation of the processing node 700.

The examples of systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium can include, for example, modulated signals transmitted through wired or wireless transmission paths.

While the teachings have been described with reference to examples of the embodiments thereof, those skilled in the art will be able to make various modifications to the described embodiments without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for minimizing interference in a wireless network, the method comprising:
   determining that an angle between a first formed beam directed towards a wireless device and a relay signal directed towards a relay node is equal to or is less than a threshold angle,
      wherein the wireless device operates in a first area of network coverage and the relay node operates in a second area of the network coverage, and
      wherein the first formed beam interferes with the relay node upon the angle being equal to or less than the threshold angle; and
   switching a connection of the relay node from a first access node to a second access node.

2. The method of claim 1, the method further comprising:
   determining that the angle between the first formed beam directed towards the wireless device and the relay signal directed towards the relay node exceeds the threshold angle; and
   switching the connection of the relay node from the second access node to the first access node.

3. The method of claim 1, the method further comprising:
   determining a number of wireless devices connected to the relay node, wherein switching the connection of the relay node from the first access node to the second access node is based at least partially in response to the number of wireless devices being less than a threshold limit.

4. The method of claim 1, the method further comprising:
   determining that a number of wireless devices connected to the relay node is greater than or equal to a threshold limit;
   disabling the first formed beam directed towards the wireless device; and
   switching the connection of the relay node from the second access node to the first access node.

5. The method of claim 1, wherein the relay signal comprises a second formed beam.

6. The method of claim 1, wherein the first area of the network coverage comprises a first sector of wireless coverage provided by the first access node and wherein the second area of the network coverage comprises a second sector of the wireless coverage provided by the first access node.

7. The method of claim 1, the method further comprising:
   determining the threshold angle based at least partially on interference measurements at different angles between the first formed beam and the relay node.

8. The method of claim 1, the method further comprising:
   causing, in response to the angle being equal to or less than the threshold angle, the relay node to change operating modes.

9. A system for minimizing interference in a wireless network, the system comprising:
   a processing node; and
   a processor coupled to the processing node, the processor configuring the processing node to perform operations comprising:
      obtaining one or more interference measurements for each of a plurality of angles between a first formed beam directed towards a wireless device in a first area of network coverage and a relay signal directed towards a relay node in a second area of the network coverage; and
      determining a threshold angle based at least partially on the one or more interference measurements, wherein the threshold angle defines an angle between the first formed beam and the relay signal that causes the first formed beam to interfere with the relay signal.

10. The system of claim 9, wherein obtaining the one or more interference measurements comprises:
    collecting the one or more interference measurements.

11. The system of claim 9, wherein obtaining the one or more interference measurements comprises:
    estimating the one or more interference measurements based at least partially on parameters of the first formed beam and parameters of the relay signal.

12. The system of claim 9, wherein the relay signal comprises a second formed beam.

13. The system of claim 9, wherein the first area of the network coverage comprises a first sector of wireless coverage provided by a first access node and wherein the second area of network coverage comprises a second sector of the wireless coverage provided by the first access node.

14. The system of claim 9, wherein the operations further comprise:
    providing the threshold angle to an access node directing the first formed beam towards the wireless device.

15. A processing node for minimizing interference in a wireless network, the processing node being configured to perform operations comprising:

determining an angle between a first formed beam directed towards a wireless device and a relay signal directed towards a relay node, wherein the wireless device operates in a first area of network coverage and the relay node operates in a second area of the network coverage;

determining whether the angle between the first formed beam and the relay signal is equal to or is less than a threshold angle, wherein a lobe of the first formed beam interferes with the relay signal when the angle is equal to or is less than the threshold angle; and mitigating interference of the lobe of the first formed beam in response to the angle being equal to or being less than the threshold angle.

16. The processing node of claim 15, wherein mitigating the interference of the lobe of the first formed beam comprises:

disabling the first formed beam directed towards the wireless device in response to the angle being equal to or less than the threshold angle.

17. The processing node of claim 15, wherein mitigating the interference of the lobe of the first formed beam comprises:

switching a connection of the relay node from a first access node to a second access node in response to the angle being equal to or less than the threshold angle.

18. The processing node of claim 15, wherein the operations further comprise:

determining whether a number of wireless devices connected to the relay node meets a threshold limit, wherein mitigating the interference of the lobe of the first formed beam is based at least partially on the number of wireless devices being greater than or equal to the threshold limit.

19. The processing node of claim 18, wherein mitigating the interference of the lobe of the first formed beam comprises:

disabling the first formed beam directed towards the wireless device in response to the angle being equal to or less than the threshold angle and in response to the number of wireless devices being greater than or equal to the threshold limit.

20. The processing node of claim 18, wherein mitigating the interference of the lobe of the first formed beam comprises:

switching a connection of the relay node from a first access node to a second access node in response to the angle being equal to or less than the threshold angle and in response to the number of wireless devices being less than the threshold limit.

\* \* \* \* \*